United States Patent
Mohr et al.

(10) Patent No.: US 7,698,542 B2
(45) Date of Patent: Apr. 13, 2010

(54) CIRCUIT AND METHOD FOR COMPARING PROGRAM COUNTER VALUES

(75) Inventors: Martin Mohr, Finsing (DE); Harry Siebert, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 475 days.

(21) Appl. No.: 11/467,370

(22) Filed: Aug. 25, 2006

(65) Prior Publication Data

US 2008/0052339 A1    Feb. 28, 2008

(51) Int. Cl.
*G06F 7/00*    (2006.01)
*G06F 7/02*    (2006.01)

(52) U.S. Cl. ...................................... 712/300
(58) Field of Classification Search ................... 712/300
See application file for complete search history.

(56) References Cited

U.S. PATENT DOCUMENTS

| | | | |
|---|---|---|---|
| 5,551,031 A * | 8/1996 | Cheng et al. ................... 707/2 |
| 5,557,791 A * | 9/1996 | Cheng et al. ................... 707/2 |
| 6,633,953 B2 * | 10/2003 | Stark ........................... 711/108 |
| 7,117,398 B2 * | 10/2006 | Flores et al. ................... 714/53 |
| 7,162,552 B2 * | 1/2007 | Nardini et al. ................ 710/68 |
| 7,171,497 B2 * | 1/2007 | Nardini et al. ................ 710/68 |
| 7,200,846 B2 * | 4/2007 | Dice et al. .................... 718/102 |
| 2004/0019774 A1 * | 1/2004 | Fuchikami et al. ............ 712/244 |
| 2004/0103129 A1 * | 5/2004 | Flores et al. ................... 708/200 |
| 2004/0103349 A1 * | 5/2004 | Nardini et al. ................ 714/39 |
| 2005/0198546 A1 * | 9/2005 | Tani ............................ 713/324 |
| 2005/0289311 A1 * | 12/2005 | Durham et al. ............. 711/163 |
| 2006/0005015 A1 * | 1/2006 | Durham et al. ............. 713/164 |
| 2006/0291338 A1 * | 12/2006 | Koda et al. ................ 369/30.07 |
| 2007/0113079 A1 * | 5/2007 | Ito et al. ....................... 713/166 |
| 2007/0234294 A1 * | 10/2007 | Gooding ...................... 717/124 |
| 2007/0300042 A1 * | 12/2007 | Moyer et al. ................... 712/34 |
| 2007/0300043 A1 * | 12/2007 | Moyer et al. ................... 712/34 |
| 2007/0300044 A1 * | 12/2007 | Moyer et al. ................... 712/34 |

* cited by examiner

*Primary Examiner*—Aimee J Li
(74) *Attorney, Agent, or Firm*—Dicke, Billig & Czaja, PLLC

(57) ABSTRACT

A circuit and a method of examining in a microprocessor a section of a first range of values and a second range of values each comprising a lower boundary value and an upper boundary value is disclosed. The method includes examining whether a value of the first range of values is equal to or greater than the lower boundary value of the second range of values, and examining whether the lower boundary value of the first range of values is smaller than or equal to the upper boundary value of the second range of values.

15 Claims, 3 Drawing Sheets fan comparator hit range
not taking increments into
account (cur_inc_r=0)

fan comparator hit range
taking arbitrary increments
cur_inc_r into account

CIRCUIT AND METHOD FOR COMPARING PROGRAM COUNTER VALUES

BACKGROUND

The present invention provides circuits for and methods of comparing values, in particular, in a microprocessor.

In one embodiment, the invention relates to circuits and methods for comparing numbers that are given as a start value and a sequence of increments, in digital circuits.

There are applications where it is to be determined at any time whether a signal reaches or passes a range of values.

Signal transitions through the range from, e.g., 10.050 to 10.060 are to be examined, whereby the values that are to be observed and are provided by e.g., a stimulating circuit are e.g., 10.000, 10.040 and 10.080 successively, given as start/increment pairs {10000, -}, {-,40}, {-, 40}. However, a simple set of two comparators ($10.050 \leq signal \leq 10.060$) will miss the transition through the above range as the provided signals do not have its granularity. (It is assumed here that when stimulating with the illustrated values, this implies that all (other) values from 10.050 to 10.060 are valid as well.)

The above type of comparison/determination is of interest when performing the trace of a program counter (PC) of a microprocessor. A PC circuit generates, to control the order of execution of a group of instructions, an address indicating a storage location of an arbitrary instruction code that is stored in a storage medium. Control may be performed in such a manner that instruction codes are executed in an order that is prescribed by a program. Instruction codes are designated by specifying addresses indicating their storage locations. The PC circuit generates such addresses and outputs the addresses as PC values.

The program counter is automatically incremented for each instruction cycle so that instructions are normally retrieved sequentially from the storage medium. However, certain instructions, such as branches and subroutine calls and returns, interrupt the sequence by placing a new value in the program counter.

In a superscalar CPU, trace hardware receives the absolute PC value only at special incidents, such as the beginning of trace or after a program branch, and code execution is otherwise indicated by the CPU in form of PC increments, wherein each increment indicates that one or more instructions have been executed.

A typical task of the trace hardware is to evaluate the received PC values for generation of control signals, e.g., break points. A set of comparators might be used to determine whether the CPU has executed instructions within a certain PC range, or even if it has executed only one specific instruction at a specific PC location.

Continuing with the abovementioned example and provided that the stimulating circuit is capable of providing increments from 2 to 40 in steps of 2, the trace hardware or comparing hardware has to compare all values from 10.040 to 10.080 in steps of 2 when receiving the value of 10.080 (actually the increment "{-,40}") in a second step after receiving the value of 10.040. This plurality of comparing processes has to be performed either in the same clock cycle or sequentially, wherein, however, the following problems arise: On the one hand, doing the comparison for each calculated value entirely is costly (typically, PC values are represented with 24 to 32 or even more bits) and, on the other hand, spending extra clock cycles is highly detrimental for processor performance, in particular when the CPU provides the increments at high bandwidth.

For these or other reasons, there is a need for the present invention.

SUMMARY

One embodiment of the invention provides a method of examining in a microprocessor a section of a first range of values and a second range of values, each having a lower boundary value and an upper boundary value, the method including examining whether a value of the first range of values is equal to or greater than the lower boundary value of the second range of values, and examining whether the lower boundary value of the first range of values is smaller than or equal to the upper boundary value of the second range of values.

Another embodiment of the invention, provides a circuit for examining a section of a first range of values and a second range of values, each having a lower boundary value and an upper boundary value, the circuit including first means for examining whether a value of the first range of values is equal to or greater than the lower boundary of the second range of values, and second means for examining whether the lower boundary of the first range of values is smaller than or equal to the upper boundary of the second range of values.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
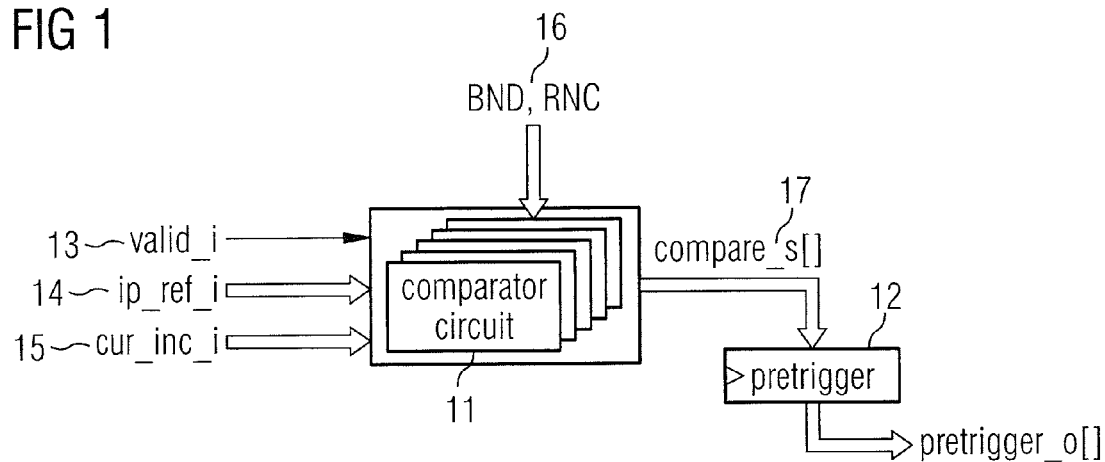
FIG. 1 illustrates a schematic, exemplary representation of a section of a program trace unit having at least one circuit according to embodiments of the invention.

FIG. 1 illustrates a schematic, exemplary representation of a section of a program trace unit (PTU) according an embodiment of the invention, e.g., the PTU of a superscalar CPU. A typical task of the PTU is, for example, to evaluate received PC values for generation of control signals, e.g., break points.

As is illustrated in FIG. 1, the PTU includes at least one comparator circuit 11.

The comparator circuit 11 receives input signals valid_I 13, ip_ref_I 14, and cur_inc_I 15. The input signal valid_I 13 indicates whether received instruction pointer increments are "currently valid" or not. Only if the traced program flow is currently linear, the instruction pointer increments can be evaluated immediately and in parallel be provided to the at least one comparator circuit 11. If however the traced program flow is currently not linear, e.g., the PTU is waiting for a branch target to arrive, then the PTU needs to intermediately accumulate the received increments until the target address arrives, as the received increments need to be interpreted relative to this target address. Thus, if the input signal valid_I 13 indicates "not currently valid" increments, the at least one comparator circuit 11 will be idle until the input signal valid_I 13 indicates "currently valid" increments. An input of pretrigger 12 is connected with an output of the at least one comparator circuit 11 providing a comparator signal 17. Based on the comparator signal 17 from the at least one comparator circuit 11, the pretrigger will provide a hit (e.g., assert a pretrigger signal 12) if at least one of the program counter (PC) values implied by the provided inputs ip_ref_I 14 and cur_inc_I 15 lies within the programmed range specified by inequation 1:

$$BND \leq PC \leq BND+RNG$$

or:

$$BND \leq ip\_ref\_r+inc_i \leq BND+RNG \text{ for any } inc_i \text{ in } 0 \ldots cur\_inc\_r \quad \text{Inequation 1}$$

Wherein:

BND is the lower boundary of the programmed range;
RNG is the width of the programmed range;
PC is the current program counter value;
ip_ref_r is the "old PC value" from the previous clock cycle;
$inc_i$ are a plurality of increments (0 ... cur_inc_r),
cur_inc_r being the maximum increment of the current clock cycle.

Figure 2:
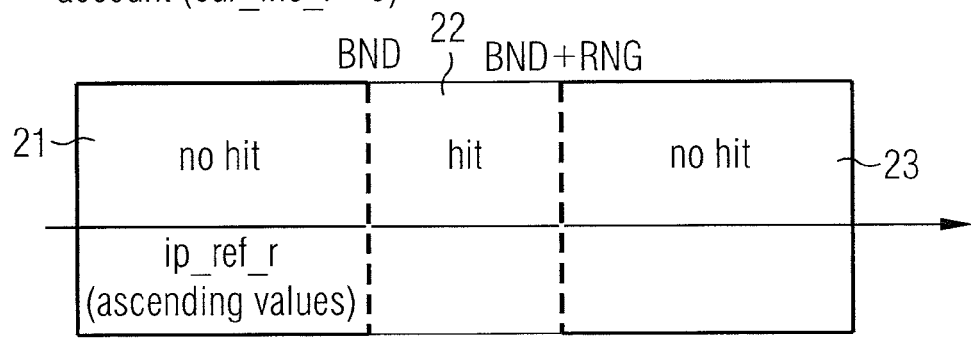
FIG. 2 illustrates a graphic illustration of an inequality to be examined by the circuit illustrated in FIG. 1.
Figure 2:
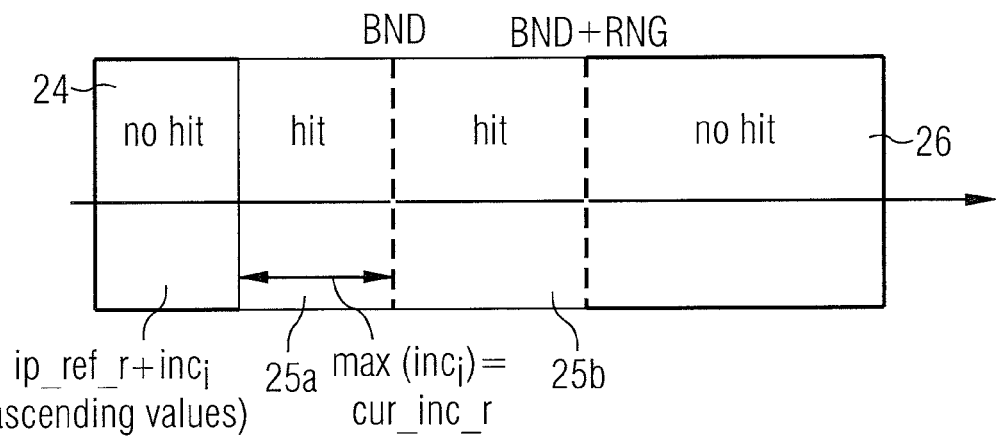

FIG. 2 illustrates a graphic illustration of inequation 1. The upper diagram illustrates inequation 1 in the case of cur_inc_r=0. In this case, inequation 1 is only true ("hit") if ip_ref_r lies within or on the boundaries BND and BND+RNG (interval 22). Otherwise, inequation 1 is false ("no hit", intervals 21 and 23).

The lower diagram illustrates a general case of inequation 1. In this case, the interval of values for ip_ref_r for which inequation 1 is fulfilled ("hit") is wider: In addition to the interval 25b (BND ... BND+RNG) which corresponds to interval 22 of the upper diagram, also values for ip_ref_r in adjacent interval 25a fulfill inequation 1. For values of ip_ref_r within this interval 25a, the current PC value (PC=ip_ref_r+$inc_i$) lies for appropriate values of $inc_i$—within the programmed range (BND ... BND+RNG). As $inc_i$ are ascending values having a maximum value of cur_inc_r, interval 25a has a width of cur_inc_r and lies below interval 25b.

Values of ip_ref_r in intervals 24 and 26 do not fulfill ("no hit") inequation 1.

To examine inequation 1, which is actually a "double-inequation", inequation 1 is divided into two partial inequations 2 and 3:

$$BND \leq ip\_ref\_r+inc_i \text{ for any } inc_i \text{ in } 0 \ldots cur\_inc\_r \quad \text{Inequation 2}$$

and $$ip\_ref\_r+inc_i \leq BND+RNG \text{ for any } inc_i \text{ in } 0 \ldots cur\_inc\_r \quad \text{Inequation 3}$$

Assumed that it is not important to know exactly, which value of $inc_i$ fulfills inequation 1, i.e. inequations 2 and 3, inequation 3 can be simplified based on the following consideration: To examine whether one of the values of ip_ref_r+$inc_i$ is smaller than or equal to BND+RNG, it is sufficient to examine whether ip_ref_r is smaller than or equal to BND+RNG: If the smallest value of ip_ref_r+$inc_i$, i.e. ip_ref_r ($inc_i$=0), is already greater than BND+RNG, no other value of ip_ref_r+$inc_i$ will be smaller than or equal to BND+RNG, which leads to simplified inequation 3a:

$$ip\_ref\_r \leq BND+RNG \quad \text{Inequation 3a}$$

Figure 3:
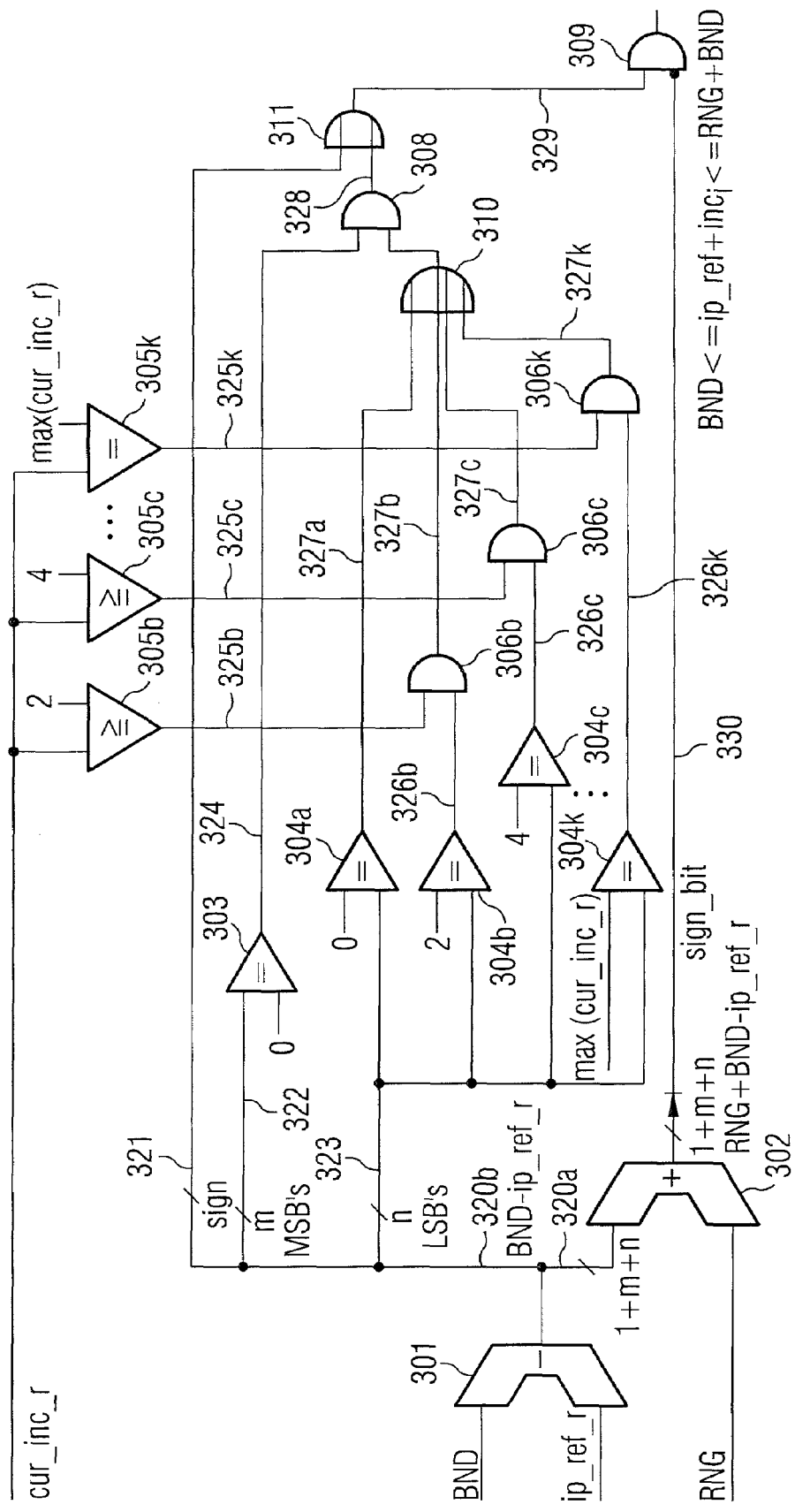
FIG. 3 illustrates an schematic diagram of a circuit according to an embodiment of the invention.

FIG. 3 illustrates a circuit in accordance with an embodiment of the invention, which is a hardware implementation of an examination of inequations 2 and 3a. The circuit of FIG. 3 includes subtracter 301, which receives the digital values of BND and ip_ref_r as input and generates a difference digital value BND−ip_ref_r as an output having a sign bit, m most significant bits (MSB's), and n least significant bits (LSB's), assumed that ip_ref_r includes m+n digits and cur_inc_r includes n digits.

The sign bit of BND−ip_ref_r is "0" if BND−ip_ref_r is positive or equal to 0, and is "1" if BND−ip_ref_r is negative.

The n LSB's of BND−ip_ref_r comprise the n lowest digits of the digital value of BND−ip_ref_r.

Further, the m MSB's of BND−ip_ref_r comprise the remaining m (highest) digits of BND−ip_ref_r.

The output of subtracter 301 is provided as a first input to adder 302 via connection 320a and is also transmitted via connection 320b, which branches out into three separate connections 321, 322, and 323. Connection 321 transmits the sign bit of BND−ip_ref_r as a first input to OR-gate 311, connection 322 transmits the m most significant bits as a first input to equality comparator 303, and connection 323 transmits the n least significant bits to a plurality of equality comparators 304a-304k.

Equality comparator 303 examines whether each of the m MSB's of BND−ip_ref_r is equal to zero (provided to a second input of comparator 303) and provides the result as logical bit (1=true, 0=false) to a first input of AND-gate 308.

Equality comparators 304a-304k respectively examine whether the n LSB's of BND−ip_ref_r are equal to any possible increments $inc_i$, i.e. for any $inc_i$ in 0 ... max(cur_inc_r). Equality comparators 304b-304k provide their respective results as logical bits (1=true, 0=false) to respective first inputs of AND-gates 306b-306k via respective connections 326b-326k, whereas the output of equality comparator 304a is directly connected to an input of OR-gate 310 via connection 327a.

Each of magnitude comparators 305b-305k receives the digital value of cur_inc_r as a first input and respectively examines whether cur_inc_r is equal to or greater than one of the possible increments $inc_i$ starting from the value of 2 and going up to the value of max(cur_inc_r) (the possible increments $inc_i$ provided as respective second inputs to the comparators 305b-305k). The results are provided as logical bits (1=true, 0=false) to respective second inputs of the respective AND-gates 306b-306k via respective connections 325b-325k.

Each of the respective outputs of the AND-gates 306b-306k is provided as further input to OR-gate 310 via connections 327b-327k.

AND-gate 308 receives—as mentioned—the output of equality comparator 303 as first input, and in addition to that the output of OR-gate 310 as second input, and provides its generated output as a second input to OR-gate 311 via connection 328.

OR-gate 311 receives—as mentioned—the sign bit of BND−ip_ref_r and the output of AND-gate 308 as inputs and provides its generated output via connection 329 as first input to AND-gate 309.

The adder 302 adds the output of subtracter 301 to the digital value RNG (received as a second input at the adder 302) and outputs a sum digital value of BND−ip_ref_r+RNG having a sign bit, m MSB's and n LSB's.

AND-gate 309 receives the negative sign bit of BND−ip_ref_r+RNG via connection 330 as a second input and—as mentioned—the output of OR-gate 311 via connection 329 as first input. The output bit of AND-gate 309, which is the final output of the circuit of FIG. 3, indicates that at least one value of the plurality of values of ip_ref_r+$inc_i$ fulfills inequations 2 and 3a if it is "1" (1=true) and indicates that no value of the plurality of values of ip_ref_r+$inc_i$ fulfills inequations 2 and 3a if it is "0" (0=false).

In the following, the examination of inequation 1 will be contemplated from a slightly different point of view. As for many applications, such as tracing of PC values, it is not important to exactly know, which value, e.g., PC value, lies within a predetermined range, e.g., programmed range (BND . . . BND+RNG), the examination of inequation 1 can be simplified as follows:

Inequation 1 can be reformulated to a simple problem of set theory: As the examined PC values also form a range or interval of discrete values (ip_ref_r . . . ip_ref_r+$inc_i$), the examination of inequation 1 can be considered as an examination of the section of two value sets or two ranges of values, respectively. Accordingly, inequation 1 is true if the section of the two ranges of values includes at least one value, whereas inequation 1 is false if the section of the two ranges of values is empty.

It must be pointed out, however, that the last conclusions are, strictly speaking, only valid for two continuous ranges of values. Otherwise, if one range of values is discrete, the section of the two ranges of values may be empty, even if both the lower/upper boundary value of one range of values is respectively smaller/greater than the lower/upper boundary value of the other range in the case of an increment of the discrete range of values being greater than the whole other range of values.

However, for certain applications, such as the tracing of PC value in a microprocessor, it may be explicitly desired to consider the discrete range of increments as an effectively continuous range additionally including all valid values lying in between the respective increments.

Accordingly, a solution for the abovementioned problem may comprise an examination of the boundary values of the two ranges of values. If the lower boundary value of one range of values is greater than the upper boundary value of the other range of values the section of the two ranges of values is empty.

Otherwise, the section includes at least one value.

Thus, inequation 1 can be simplified when divided into two partial inequations:

$$BND \leq ip\_ref\_r + cur\_inc\_r \qquad \text{Inequation 2b}$$

and $$ip\_ref\_r \leq BND + RNG \qquad \text{Inequation 3b}$$

However, if the values to be examined have a high absolute value a hardware solution implementing exactly the solution approach from above will require large and costly magnitude comparators for comparing high values (e.g., 24 or 32 bit values or even more).

For this reason, ip_ref_r is respectively subtracted on both sides of inequations 2b and 3b and inequations 2b and 3b are written as:

$$BND - ip\_ref\_r \leq cur\_inc\_r \qquad \text{Inequation 2b'}$$

and $$0 \leq BND - ip\_ref\_r + RNG \qquad \text{Inequation 3b'}$$

Thereby, only significantly smaller values have to be compared to examine inequations 2b' and 3b'.

Inequation 2b' may be further simplified for hardware implementation as follows:

$$BND - ip\_ref\_r - cur\_inc\_r \leq 0 \qquad \text{Inequation 2b''}$$

Thus, only two sign examinations have to be performed to examine equations 2b'' and 3b': For equation 2b'', the sign of the value of BND−ip_ref_r−cur_inc_r has to be examined, and for equation 3b', the sign of the value of BND−ip_ref_r+RNG has to be examined. A correspondent embodiment of the invention will now be discussed in detail with reference to FIG. 4.

Figure 4:
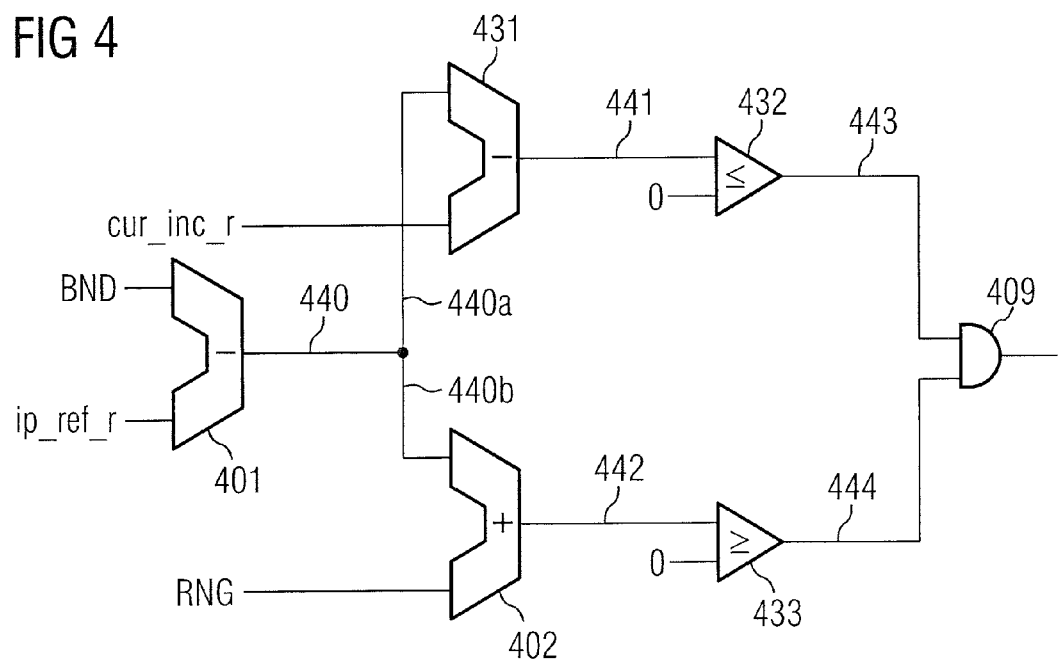
FIG. 4 illustrates an schematic diagram of a circuit according to a further embodiment of the invention.

FIG. 4 illustrates a circuit in accordance with an embodiment of the invention, which is a hardware implementation of an examination of inequations 2b'' and 3b'.

The circuit of FIG. 4 includes subtracter 401, which receives the values of BND and ip_ref_r as first and second input and generates a difference value BND−ip_ref_r.

The output of subtracter 401, BND−ip_ref_r, is provided as a first input to subtracter 431 via connections 440 and 440a and also as a first input to adder 402 via connections 440 and 440b.

The subtracter 431 additionally receives the value of cur_inc_r (as a second input) and subtracts cur_inc_r from the output of subtracter 401, BND−ip ref_r, to generate a difference value, BND−ip_ref_r_cur_inc_r. Comparator 432 receives the difference value and examines whether the difference value of BND−ip_ref_r_cur_inc_r is smaller than or equal to zero. If the difference value of BND−ip_ref_r_cur_inc_r is smaller than or equal to zero comparator 432 provides a logical "1" (true) to a first input of AND-gate 409 via connection 443, and a logical "0" (false) if the difference value of BND−ip_ref_r_cur_inc_r is greater than zero.

Adder 402 as mentioned receives the output of subtracter 401 BND−ip_ref_r as a first input, and the value of RNG as a second input and outputs a sum value, BND−ip_ref_r+RNG, to comparator 433 via connection 442.

Comparator 433 examines whether the sum value of BND−ip_ref_r+RNG is greater than or equal to zero. If the sum value of BND−ip_ref_r+RNG is greater than or equal to zero comparator 433 provides a logical "1" (true) to a second input of AND-gate 409 via connection 444, and a logical "0" (false) if the sum value of BND−ip_ref_r+RNG is smaller than zero.

AND-gate 409 as mentioned receives the outputs of comparators 432 and 433 as inputs and provides a logical "1"

(true) only if the outputs of the comparators 432 and 433 are both true, otherwise it provides a logical "0" (false).

The output of AND-gate 409, which is also the final output of the circuit of FIG. 4, is therefore true ("0"), if both inequations 2b" and 3b' are fulfilled, and otherwise false ("1").

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for evaluating a plurality of program counter (PC) values in a microprocessor, whereby it is examined whether at least one program counter value of the plurality of program counter values lies within a predefined first range of values, the plurality of program counter values defining a second range of values, the first range of values and the second range of values each comprising a lower boundary value and an upper boundary value, wherein the first range of values comprises a predetermined maximum width, the method comprising examining a section of the first range of values and the second range of values comprising:
   i. examining whether the lower boundary value of the first range of values is greater than the upper boundary value of the second range of values, and if so, determining that the section of the first and second range of values is empty; and
   ii. examining whether a sum of the lower boundary value of the first range of values and the predetermined maximum width of the first range of values is smaller than the lower boundary value of the second range of values, and if so, determining that the section of the first and second range of values is empty.

2. The method according to claim 1, further comprising:
examining whether the upper boundary value of the first range of values is smaller than the lower boundary value of the second range of values, and if so, determining that the section of the first and second range of values is empty.

3. The method according to claim 2, further comprising:
determining that the section of the first and second range of values comprises at least one value if the lower boundary value of the first range of values is not greater than the upper boundary value of the second range of values;
where the sum of the lower boundary value of the first range of values and the predetermined maximum width of the first range of values is not smaller than the lower boundary value of the second range of values; and
the upper boundary value of the first range of values is not smaller than the lower boundary value of the second range of values.

4. The method according to claim 1, comprising using the method in the microprocessor to examine whether a predetermined range of instructions have been processed, wherein each instruction comprises an assigned value.

5. A circuit for evaluating a plurality of program counter (PC) values in a microprocessor the circuit configured to examine whether at least one program counter value of the plurality of program counter values lies within a predefined first range of values, the plurality of program counter values defining a second range of values, the first range of values and the second range of values each comprising a lower boundary value and an upper boundary value, wherein the first range of values comprises a predetermined maximum width, the circuit configured to examine a section of the first range of values aid the second range of values, and configured to:
   iii. examine whether the lower boundary value of the first range of values is greater than the upper boundary value of the second range of values, and if so, determine that the section of the first and second range of values is empty; and
   iv. examine whether a sum of the lower boundary value of the first range of values and the predetermined maximum width of the first range of values is smaller than the lower boundary value of the second range of values, and if so, determine that the section of the first and second range of values is empty.

6. The circuit according to claim 5, wherein the circuit is configured to determine that the section of the first and second range of values is empty if the lower boundary value of the first range of values is greater than the upper boundary value of the second range of values.

7. The circuit according to claim 6, wherein the circuit is configured to determine that the section of the first and second range of values is empty if the upper boundary value of the first range of values is smaller than the lower boundary value of the second range of values.

8. The circuit according to claim 5, wherein the circuit is configured to determine that the section of the first and second range of values is empty if the sum of the lower boundary value of the first range of values and the predetermined maximum width of the first range of values is smaller than the lower boundary value of the second range of values.

9. The circuit according to claim 5, wherein the circuit is configured to examine whether the section of the first and second range of values is empty by examining whether the upper boundary value of the first range of values is smaller than the lower boundary value of the second range of values.

10. A method for evaluating a plurality of program counter (PC) values in a microprocessor, whereby it is examined whether at least one program counter value of the plurality of program counter values lies within a predefined first range of values, the plurality of program counter values defining a second range of values, the first range of values and a second range of values each comprising a lower boundary value and an upper boundary value, the method comprising examining a section of the first range of values and the second range of values comprising:
examining whether a value of the first range of values is equal to or greater than the lower boundary value of the second range of values,
examining whether the lower boundary value of the first range of values is smaller than or equal to the upper boundary value of the second range of values; and
determining whether the section of the first and second range of values is empty based on the examinations.

11. The method according to claim 10, comprising examining whether a value of the first range of values is equal to or greater than the lower boundary value of the second range of values comprises examining whether the upper boundary value of the first range of values is greater than the lower boundary value of the second range of values.

12. The method according to claim 10, comprising examining whether a value of the first range of values is equal to or greater than the lower boundary value of the second range of values further comprises examining whether a sum of the lower boundary value of the first range of values and a predetermined maximum width of the first range of values is smaller than the lower boundary value of the second range of values.

13. A circuit for evaluating a plurality of program counter (PC) values in a microprocessor, the circuit configured to examine whether at least one program counter value of the plurality of program counter values lies within a predefined first range of values, the plurality of program counter values defining a second range of values, the first range of values and a second range of values each comprising a lower boundary value and an upper boundary value, the circuit configured to examine a section of the first range of values and the second range of values, comprising:
- a first circuit for examining whether a value of the first range of values is equal to or greater than the lower boundary of the second range of values,
- a second circuit for examining whether the lower boundary value of the first range of values is smaller than or equal to the upper boundary of the second range of values; and
- a third circuit for determining whether the section of the first and second range of values is empty based on the examinations.

14. The circuit according to claim 13, comprising where the first circuit for examining whether a value of the first range of values is equal to or greater than the lower boundary value of the second range of values comprise means for examining whether the upper boundary value of the first range of values is greater than the lower boundary value of the second range of values.

15. The circuit according to claim 13, comprising where the first circuit for examining whether a value of the first range of values is equal to or greater than the lower boundary value of the second range of values further comprise additional means for examining whether a sum of the lower boundary value of the first range of values and a predetermined maximum width of the first range of values is smaller than the lower boundary value of the second range of values.

* * * * *